(12) United States Patent
Costa et al.

US007060240B2

(10) Patent No.: US 7,060,240 B2
(45) Date of Patent: Jun. 13, 2006

(54) SOL-GEL PROCESS FOR THE MANUFACTURE OF NANOCOMPOSITE PHOTOLUMINESCENT MATERIALS AND MATERIALS THUS PRODUCED

(75) Inventors: Lorenzo Costa, Sommo (IT); Pier Paolo Costa, Sommo (IT); Fulvio Costa, Sommo (IT)

(73) Assignee: Degussa Novara Technology S.p.A., Novara (IT)

( * ) Notice: Subject to any disclaimer, the term of this patent is extended or adjusted under 35 U.S.C. 154(b) by 0 days.

(21) Appl. No.: 10/713,279

(22) Filed: Nov. 14, 2003

(65) Prior Publication Data

US 2004/0099843 A1    May 27, 2004

Related U.S. Application Data

(62) Division of application No. 09/985,642, filed on Nov. 5, 2001, now Pat. No. 6,730,282.

(51) Int. Cl.
*C01B 33/12*    (2006.01)
*C01B 33/02*    (2006.01)

(52) U.S. Cl. ..................... 423/338; 423/349
(58) Field of Classification Search ............... 423/338, 423/349
See application file for complete search history.

(56) References Cited

U.S. PATENT DOCUMENTS

| | | |
|---|---|---|
| 4,317,668 A | 3/1982 | Susa et al. |
| 4,426,216 A | 1/1984 | Satoh et al. |
| 4,432,956 A | 2/1984 | Zarzycki et al. |
| 4,806,328 A | 2/1989 | Van Lierop et al. |
| 5,858,280 A | 1/1999 | Zhang et al. |

FOREIGN PATENT DOCUMENTS

WO    WO 00/14013    3/2000

OTHER PUBLICATIONS

Maeda, Y., "Preparation of Nanometer-Size Crystalline Ge by Chemical Sol-Gel Method and Its Visible Photoluminescence," Japanese Journal of Applied Physics, 1994, pp. 254-256, vol. 34, No. 34-1, suppl, XP000527446, ISSN: 0021-4922, Publication Office Japanese Journal of Applied Physics, Tokyo, Japan (3 pages).

Garcia, M. A. et al., "Characteristic UV luminescence from sol-gel silica coatings," Materials Letters, Mar. 2000, pp. 23-26, vol. 43, No. 1-2, XP004256374, ISSN: 0167-577X, North Holland Publishing Company, Amsterdam, NL (4 pages).

Fujita, S. et al., "Visible light-emitting devices with Schottky contacts on an ultrathin amorphous silicon layer containing silicon nanocrystals," Applied Physics Letters, Jan. 11, 1999, pp. 308-310, vol. 74, No. 2, XP000804879, ISSN:0003-6951, American Institute of Physics, New York, US (3 pages).

Mutti, P. et al., "Room-temperature visible luminescence from silicon nanocrystals in silicon implanted $SiO_2$ layers," Applied Physics Letters, Feb. 13, 1995, vol. 66, No. 7, pp. 851-853, XP000489875, ISSN: 0003-6951, American Institute of Physics, New York, US (3 pages).

*Primary Examiner*—Colleen P. Cooke
(74) *Attorney, Agent, or Firm*—Smith, Gambrell & Russell, LLP

(57) ABSTRACT

It is described a process based on sol-gel chemistry suitable to the production of nanocomposite materials being photoluminescent at ambient temperature, comprising silicon grains of dimension of nanometers embedded in a silica matrix.

28 Claims, 2 Drawing Sheets

SOL-GEL PROCESS FOR THE MANUFACTURE OF NANOCOMPOSITE PHOTOLUMINESCENT MATERIALS AND MATERIALS THUS PRODUCED

REFERENCE TO A RELATED APPLICATION

This application is a divisional application of our application Ser. No. 09/985,642 filed Nov. 5, 2001, now U.S. Pat. No. 6,730,282 which is relied on and incorporated herein by reference.

INTRODUCTION AND BACKGROUND

The present invention is about a sol-gel process for the manufacture of nanocomposite materials being photoluminescent at ambient temperature and the materials obtained through this process. The term "nanocomposite" has recently become of common use in the field of materials science to define bodies or films having the feature of containing at least one material in grains or crystals having dimensions in the range of the nanometers; generally the grains of the material in nanometric dimension are dispersed in a matrix of a different material.

The phenomenon of photoluminescence at ambient temperature in silicon was discovered in 1990 in porous silicon obtained by anodic etching of a silicon wafer. Although the physical principles underlying the phenomenon are not fully understood yet, it seems that this may be ascribed, at least partially, to nanostructural features of the material and the resulting quantum effects associated to the confinement to extremely reduced distances, in the range of nanometers (nm), of the motion of charge carriers such as electrons and holes. Nanocomposite materials of suitable composition have also been known for some time for their non-linear optical properties and for their luminescence. Nanocomposite photoluminescent materials have a potential application as light sources, and the ones based on silicon, if their production proves to be compatible with silicon technology, may be used in electronic devices as well. Possible uses in the optoelectronic field are also foreseen for these materials, thanks to the possibility of modulating the dielectric properties of silica or of enhancing the emission properties of radiative centres, such as $Er^{3+}$ ions in silica. It is also studied the possible use of these materials for the production of extremely high density memories, through the realization of single-electron transistors, wherein the electron is confined in a space having dimensions of few nanometers buried in an insulating matrix, for instance silica, $SiO_2$.

As a consequence of these possible applications, a strong interest exists in the industry in the possibility of obtaining nanocomposite materials of controlled characteristics, in a way that is both reproducible and compatible with the technologies typical of the semiconductor industry, and in particular with the technology of silicon.

Several techniques have been proposed for the production of nanocomposite materials, generally in the form of particles of silicon or silicon carbide with dimensions in the range of nanometers in a matrix of silica.

A first synthesis route is described in an article of Chawet et al., Journal of Applied Physics, vol. 85, April 1999, No. 8, pages 4032–4039. According to the method of this article, a composite material comprising silicon particles having dimensions of nanometers in $SiO_2$ is produced by co-sputtering of a $SiO_2$ target and several pieces of Si each having a surface of 1 $cm^2$. Sputtering and modifications thereof (among which co-sputtering) are techniques very well known in the field of materials science and microelectronic industry. By these methods it is possible to produce nanocomposite materials in the shape of thin layers, having a thickness generally lower than about 1 micron, over an inert support. According to the contents of the cited article, nanocomposite layers thus produced become photoluminescent only after a thermal treatment at temperatures in excess of 900° C.

An article of Mutti et al., Applied Physics Letters, vol. 66, February 1995, No. 7, pages 851–853, describes the production by ionic implantation of $Si^+$ ions in $SiO_2$ of nanocomposite materials made up of silicon particles with dimensions in the range of nanometers in silica. In this case too the product of ion implantation must be thermally treated at temperatures of at least 1000° C. in order to observe the appearance of photoluminescence.

The methods of the two articles above are suitable for research purposes but, due to low productivity, cannot be exploited in industrial productions.

A chemical synthesis route of nanocomposite materials has been proposed recently. An article of Guangining Li et al., Applied Physics Letters, vol. 76, June 2000, No. 23, pages 3373–3375, describes a sol-gel synthesis of nanocomposite photoluminescent materials consisting of SiC particles in silica. According to the teachings of this article, a sol-gel synthesis is carried out using a standard silica precursor, e.g. tetraethylorthosilane (TEOS), to which a modifier component is added. Said modifier component is chosen among silicon alkoxides wherein the —OR radicals are partially substituted by aromatic hydrocarbon radicals; an example of such modified alkoxides is diethoxydiphenylsilane. The modifier component may also be chosen among aromatic compounds with condensed rings (such as anthracene) or conjugated rings (such as stilbene). The modifier component may be added to TEOS in the starting solution; alternatively, the synthesis may be started with TEOS alone and, once a wet silica gel is obtained, its pores may be soaked with the modifier component. The thus obtained gels are then dried and treated at temperatures comprised between about 800 and 1000° C. in an atmosphere of air or nitrogen. This synthesis route is an improvement from the industrial standpoint compared to previous methods, but still has some drawbacks: alkoxides substituted with aromatic radicals are reagents of rather high cost, while conjugated- or condensed-rings aromatic compounds are only sparingly soluble in the hydroalcoholic solutions used in the first steps of sol-gel processes thus posing homogeneity problems; besides, aromatic hydrocarbons or compounds containing aromatic hydrocarbon radicals are generally carcinogenic, their industrial use thus being potentially dangerous and undesirable.

SUMMARY OF THE INVENTION

It is thus an object of the present invention to provide a sol-gel process free of the drawbacks of the prior art for the manufacture of nanocomposite materials, based on the silicon/silica combination, being photoluminescent at ambient temperature; a further object of the invention is to provide the materials obtained through this process.

These objects are achieved according to the present invention with a sol-gel process comprising the following steps:
  preparing an aqueous or hydroalcoholic mixture containing a silicon alkoxide, an additional component A, and an acidic catalyst, wherein the molar ratio between water molecules and silicon atoms is equal to or higher than 4;
  causing the mixture to gel obtaining a wet gel;
  causing said wet gel to dry; and
  densify the thus obtained dry gel by means of a thermal treatment having a maximum temperature comprised between 1200° C. and 1400° C.;

characterized in that:
the additional component A is a dialkyldialkoxysilane, $R_2$—Si—$(OR')_2$, or an alkyltrialkoxysilane, R—Si—$(OR')_3$, wherein R and R' radicals are not aromatic; and in the range from 300 to 800° C. the thermal treatment is carried out under an atmosphere made up of pure HCl or a mixture containing at least 5% by volume of HCl in an inert gas, said atmosphere being anhydrous and not containing oxygen.

The inventors have found that by using as the additional component A an alkylalkoxysilane as one of the starting reagents in the sol-gel process, and treating in the range from 300 to 800° C. the dry gel obtained as an intermediate product of the process with an atmosphere of HCl (or HCl mixed with an inert gas) not containing water and oxygen, a black, non-transparent material is obtained that, analyzed with spectrophotometric methods, shows the presence of elemental silicon as well as intense emission bands in the IR range, with a tail in the red part of the visible region of the electromagnetic spectrum.

BRIEF DESCRIPTION OF DRAWINGS

The invention will be described in the following with reference to the figures wherein.

DETAILED DESCRIPTION OF INVENTION

Figure 1:
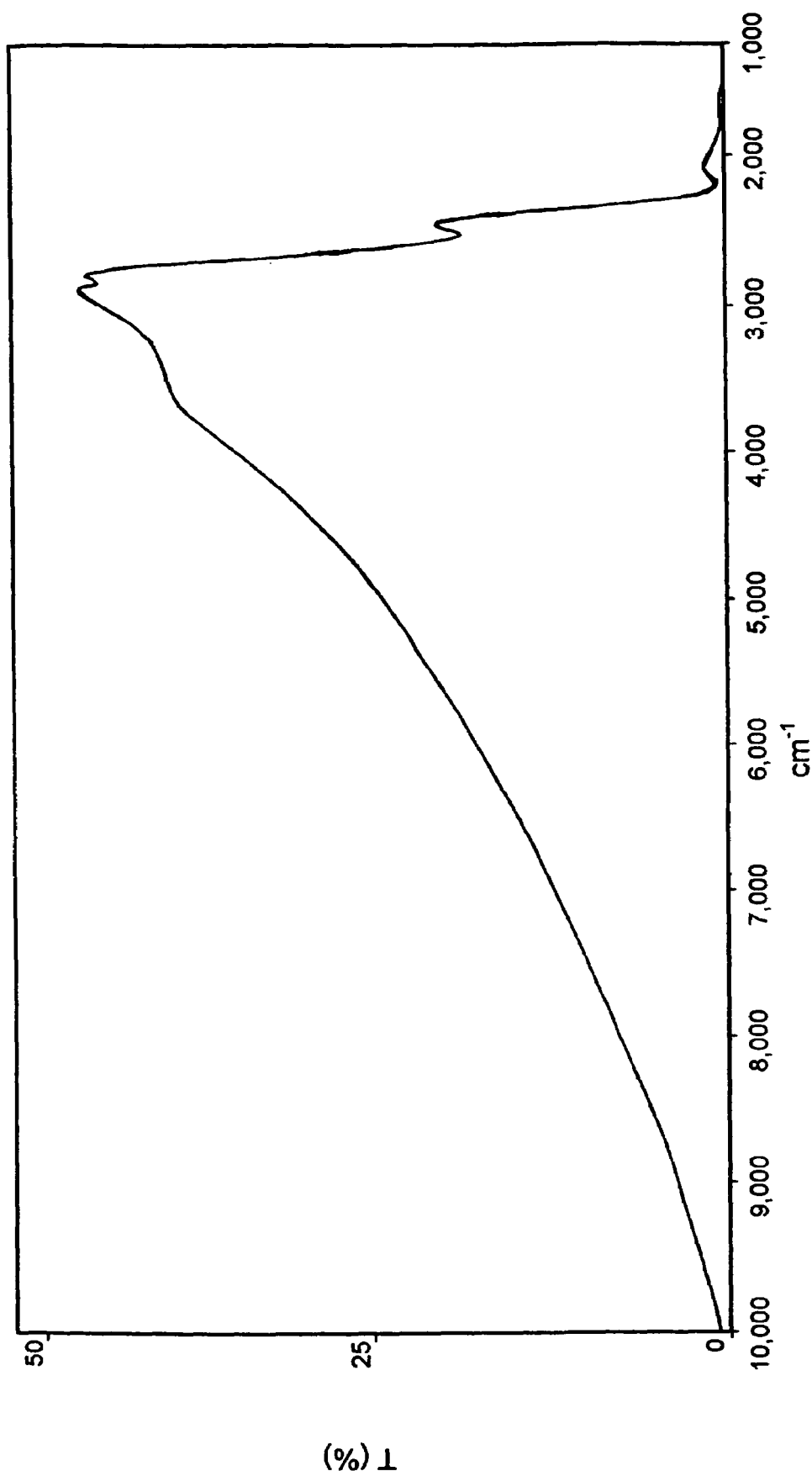
FIG. 1 shows an IR transmittance spectrum of a material of the invention.

The first step of the process of the invention is the preparation of the mixture containing reagents and precursors needed for the synthesis of the material. Besides the use of the additional component A, this step follows standard principles and methods of sol-gel processes and will thus not be discussed in depth here. For an illustration of the basics of the sol-gel technique, reference can be made to the vast literature in the field, both articles and patents, among which e.g. U.S. Pat. Nos. 4,317,668, 4,426,216, 4,432,956 and 4,806,328. In the following, the process of the invention is described in detail only as to its characteristic aspects.

The starting mixture comprises a solvent, generally a hydroalcoholic mixture or, preferably, pure water; to the solvent, a silicon alkoxide (preferably tetramethoxysilane, TMOS, or tetraethoxysilane, TEOS), and the additional component A are added.

The additional component A may be a dialkyldialkoxysilane, having general formula $R_2$—Si—$(OR')_2$, or an alkyltrialkoxysilane, of general formula R—Si—$(OR')_3$. The alkyl groups R and R' are preferably radicals with a low number of carbon atoms; preferred are the alkylalkoxysilanes wherein the R groups are methyl, ethyl, propyl and butyl. It is possible to use components A wherein not all the R or R' groups are alike, such as components of the following general formulas:

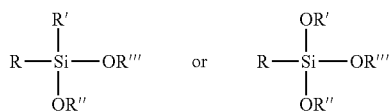

The above compounds are however more difficult to synthesise and have a higher cost, without offering special advantages, than simple compounds where all —R radicals are the same and all —OR groups are the same. Preferred compounds for use in the process of the invention are methyltrimethoxysilane, $CH_3$—Si$(OCH_3)_3$, and methyltriethoxysilane, $CH_3$—Si$(OCH_2CH_3)_3$.

The molar ratio between the alkoxide (e.g., TEOS) and the compound A may vary in a broad range and it is generally comprised between 1.86 and 999, and preferably between 2.33 and 9.

The mixture containing the alkoxide and the compound A is homogenized by mechanical stirring or ultrasonic agitation, and then acidified by addition of an acid, generally HCl, in such a concentration as to bring the pH of the mixture at a value in the range between about 1 and 2. The acid acts as a catalyst for alkoxides hydrolysis, with cleavage of the bond between the silicon atom and the oxygen atom of the alkoxide radical, and subsequent formation of a Si—OH bond with a —OH radical coming from a water molecule. Hydrolysis is favoured by the presence of a great quantity of water, that is present in an amount of at least 4 molecules per silicon atom in the mixture.

The thus obtained mixture may be employed to produce thin layers as well as three-dimensional bodies of the nanocomposite material. In the first case, when the mixture is still in a low-viscosity stage, it may be poured upon a substrate, possibly according to the well known spin-coating technique, in which the substrate is rotated at high speed in order to assure a complete coverage of the same with the mixture; alternatively, it is possible to dip the substrate to be covered into the mixture, and then pull it out, according to the dip-coating technique.

In case it is desired to obtain a three-dimensional body, it is preferable to add pyrogenic silica to the mixture. Pyrogenic silica is a form of silica in powder with grains having dimension in the range of microns or lower, produced by burning in suitable chambers $SiCl_4$ with oxygen. Pyrogenic silica is a commercially available product, sold for instance by the company Degussa Hüls with the trade name Aerosil OX-50. After the mixture has been added with pyrogenic silica and suitably homogenized, it may be poured in a mould of the desired shape (or, it can be left in the container where it has been prepared if this has a suitable shape).

The mixture containing the hydrolysed alkoxysilanes and alkylalkoxysilanes undergoes spontaneous gelation if temperature and pH are not too low. Gelation may be accelerated, as it is well known in the field, raising pH to values above 4, preferably above 4.5, and/or raising temperature at about 50° C. A wet gel is obtained, that may be dried in open air, or in an oven kept at a temperature comprised, for instance, between 40 and 60° C. Alternatively, it is possible to resort to supercritical drying, a well-known technique in the field of sol-gel processes.

The dry gel (both in the form of thin layer over a substrate or as a discrete body) is then densified by means of a thermal treatment of which the final temperature is comprised between about 1,200 and 1,400° C. A condition that characterises the process of the invention is that, in the range of temperatures between 300 and 800° C., the dry gel is exposed to an atmosphere consisting in HCl or a gaseous mixture containing at least 5% by volume of HCl in an inert gas, said atmosphere being anhydrous and not containing oxygen. The inert gas is nitrogen or a noble gas, preferably helium.

At temperatures lower than 300° C. or higher than 800° C., the dry gel can be treated with different gases, for instance noble gases or nitrogen. At the beginning of the densification thermal treatment, and up to about 100° C., the dry gel can also be shortly treated in air.

The invention will be further illustrated by the following non-limiting examples, having the object of teaching those skilled in the art how to practice the invention.

EXAMPLE 1

100 grams of TEOS (0.48 moles) and 8.55 grams of methyltriethoxysilane (0.048 moles) are poured under agitation in a Pyrex glass having capacity of 1 litre, obtaining a clear, single-phase liquid. Still under agitation, 300 cc of a aqueous solution of HCl of concentration 0.01 N are added; an emulsion of two non-miscible liquids is obtained. The emulsion is ultrasonically agitated during 15 minutes, by immersing in the emulsion the transducer of an ultrasonic generator mod. V 1A of the company Sonics & Materials Inc., of Newtown, Conn., USA. During this operation the alkoxides are hydrolysed and a clear, single-phase solution is obtained. This solution is subjected to low-pressure evaporation for extracting the ethanol produced during the hydrolysis. 60 grams (1 mole) of pyrogenic silica Aerosil OX-50 are then added to the solution: a suspension is obtained, that is homogenized by mechanical stirring first and then by ultrasonic agitation. An homogeneous sol of milky colour and having pH 2 is obtained.

The gelation of the sol is favoured by adding, slowly and under agitation, an aqueous solution of ammonia of concentration 0.05 N, until pH 4 is reached: this sol is poured in Teflon beakers having an inner diameter of 9 cm, in an amount of 100 cc in each beaker. The beakers are sealed and the sol is allowed to rest for 14 hours, during which gelation takes place. The thus obtained gels are taken out from the beakers, placed in Pyrex containers, and subjected to a series of washing steps in order to exchange the liquid phase in the gel pores: in a first operation water is exchanged with acetone, and then this latter with ethyl acetate. These samples are dried by supercritical extraction of ethyl acetate, by means of a treatment in an autoclave, at a temperature of about 270° C. and a pressure of 35 bar. White aerogels are extracted from the autoclave. These are subsequently densified according to the following thermal treatment, in an oven connected to gas-feeding lines:

heating from ambient temperature to 800° C. during 8 hours, under an atmosphere of 10% HCl in helium, anhydrous and not containing oxygen;
keeping at 800° C. during 2 hours under the same atmosphere;
keeping at 800° C. during 2 hours under pure helium;
heating from 800° C. to 1,400° C. during 8 hours under pure helium;
natural cooling down to ambient temperature.

The samples extracted from the oven are fully glassy and black in colour.

EXAMPLE 2

An infrared transmittance measure is carried out on a sample prepared as described in example 1 by using a FTIR analyser NICOLET NEXUS. The result of the test is the spectrum reproduced in FIG. 1, showing the transmittance of the sample, T (in %), as a function of the frequency, $cm^{-1}$. The spectrum in FIG. 1 shows that the sample completely absorbs the IR radiation at frequencies higher than about 10,000 $cm^{-1}$: this is a typical feature of elemental silicon. At frequencies lower than about 10,000 $cm^{-1}$ the sample becomes more and more transparent to the radiation, reaching a maximum in transmittance at about 3,000 $cm^{-1}$; at even lower frequencies the sample begins to absorb, reaching total absorbance around 2,000 $cm^{-1}$. This latter behaviour is typical of silica.

EXAMPLE 3

The samples produced as described in example 1 are preliminarily tested to check the presence of photoluminescence at ambient temperature. To this end, the samples are exposed to UV radiation of wavelength 365 nm obtained by filtering the radiation emitted by a mercury lamp. At visual inspection, all samples show a strong emission of deep red colour that can be attributed to an emission band centred at 780 nm, known in the literature as typical in silicon-based photoluminescent materials.

EXAMPLE 4

Figure 2:
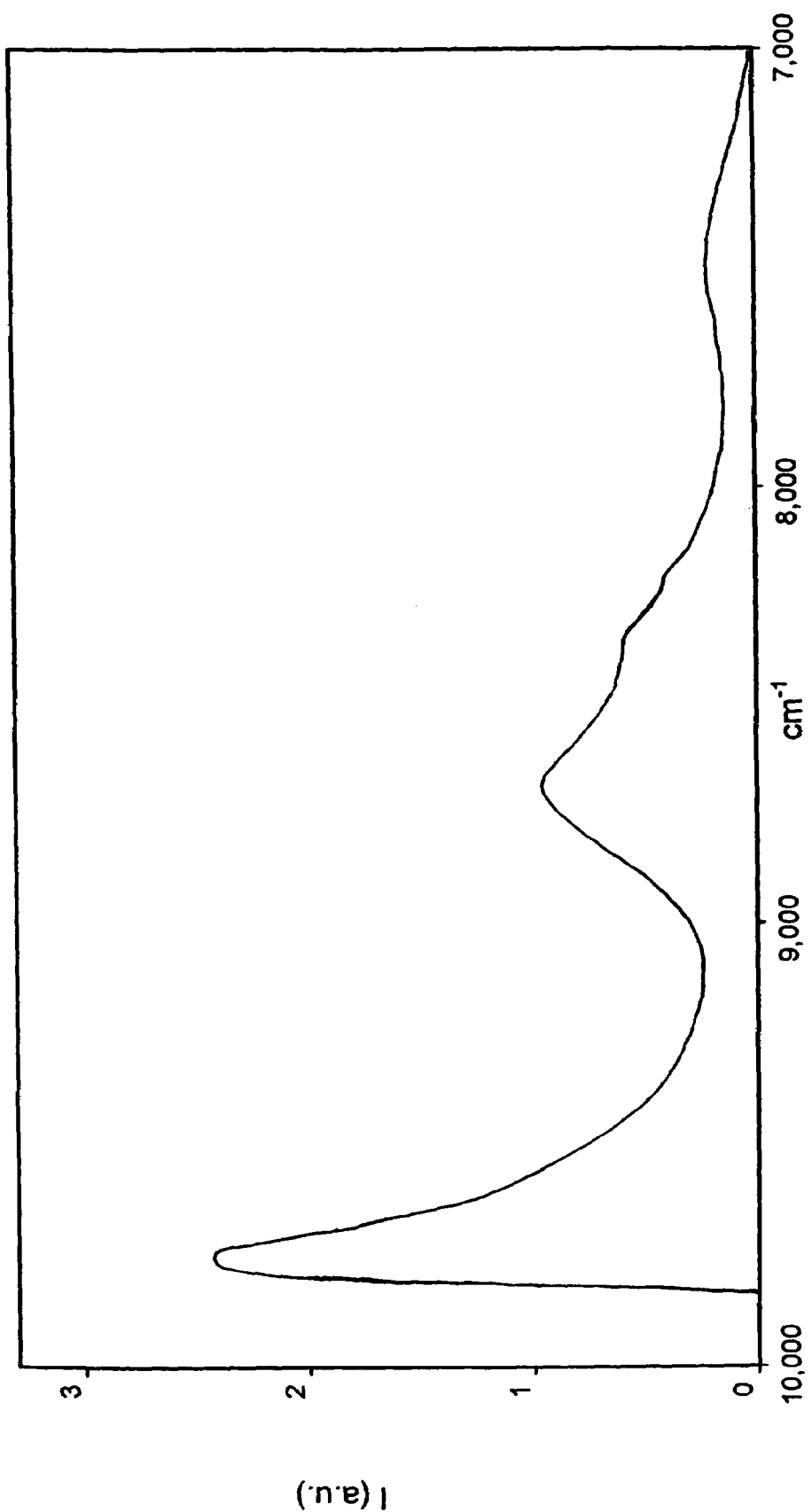
FIG. 2 shows an emission spectrum resulting from a photoluminescence test carried out at ambient temperature on a material of the invention.

A sample prepared as described in example 1 is subjected to a photoluminescence test at ambient temperature. The sample is irradiated with IR laser light of wavelength 1050 nm, and the emission spectrum of the sample is collected with a Raman spectrophotometer Bruker mod. FRA 106. This spectrum is reproduced in FIG. 2, showing the emission intensity, I (in arbitrary units), as a function of frequency and wavelength, measured in $cm^{-1}$ and nm respectively. In the spectrum three emission bands are noted, centred at about 9,750 $cm^{-1}$, 8,680 $cm^{-1}$ and 7,500 $cm^{-1}$.

The analysis of results clearly shows that the process of the invention enables the production of composite materials comprising elemental silicon and silica, as can be derived by the absorbance spectrum in FIG. 1. These materials are photoluminescent at ambient temperature, as shown by the emission in the red region of the visible spectrum and by the IR emission bands (FIG. 2): this is an indirect evidence that the structure of these materials is such that elemental silicon is present in form of grains of dimension of nanometers embedded in the silica matrix.

The invention claimed is:

1. Nanocomposite materials that are fully glassy, black in color, and photoluminescent in red visible light region and/or in infrared region at ambient temperature produced by a sol-gel process comprising:
   preparing an aqueous or hydroalcoholic mixture containing a silicon alkoxide, an additional component A, and an acidic catalyst, wherein the molar ratio between water molecules and silicon atoms is equal to or higher than 4;
   causing the mixture to gel thereby obtaining a wet gel;
   causing said wet gel to dry; and
   densifing the thus obtained dry gel by means of a thermal treatment having a maximum temperature from 1200° C. to 1400° C.; where
   the additional component A is a dialkyldialkoxysilane, $R_2$—Si—$(OR')_2$, or an alkyltrialkoxysilane, R—Si—$(OR')_3$, wherein R and R' radicals are not aromatic; and
   in the range from 300° C. to 800° C. the thermal treatment is carried out under an atmosphere made up of pure HCl or a mixture containing at least 5% by volume of HCl in an inert gas, said atmosphere being anhydrous and not containing oxygen.

2. The nanocomposite materials according to claim 1 wherein the silicon alkoxide is tetramethoxysilane or tetraethoxysilane.

3. The nanocomposite materials according to claim 1 wherein the acidic catalyst is HCl.

4. The nanocomposite materials according to claim 1 wherein the —R groups of the additional component A are selected from the group consisting of methyl, ethyl, propyl and butyl, and the —OR groups of the additional component A are selected from the group consisting of methoxy, ethoxy, propoxy and butoxy.

5. The nanocomposite materials according to claim 4 wherein the additional component A is selected from the group consisting of methyltrimethoxysilane and methyltriethoxysilane.

6. The nanocomposite materials according to claim 1 wherein the molar ratio between the silicon alkoxide and the additional component A is from 1.86 to 999.

7. The nanocomposite materials according to claim 6 wherein said molar ratio is from 2.33 to 9.

8. The nanocomposite materials according to claim 1 wherein pyrogenic silica is present.

9. The nanocomposite materials according to claim 1 wherein gelation is obtained by raising the pH of the mixture.

10. The nanocomposite materials according to claim 9 wherein raising the pH of the mixture is realized by adding a solution of ammonia.

11. The nanocomposite materials according to claim 1 wherein sol gelation is obtained by raising the temperature to a value in the range of 40° C. to 60° C.

12. The nanocomposite materials according to claim 1 wherein drying of the wet gel is obtained by evaporation of liquid in pores of the gel.

13. The nanocomposite materials according to claim 1 wherein drying of the wet gel is obtained by supercritical extraction of liquid in pores of the gel.

14. The nanocomposite materials according to claim 3 wherein, before the supercritical extraction, the wet gel is subjected to an operation of exchange of liquid in pores of the gel.

15. The nanocomposite materials according to claim 1 wherein the sol is deposited in form of a thin layer on a substrate by immersing the substrate in the sol and then extracting the substrate from the sol.

16. The nanocomposite materials according to claim 1 wherein the sol is deposited in form of a thin layer on a substrate by depositing a drop of the sol on the substrate and rotating the substrate at high speed.

17. Supported thin layers of nanocomposite materials that are fully glassy, black in color, and photoluminescent in red visible light region and/or in infrared region at ambient temperature produced by
   preparing an aqueous or hydroalcoholic mixture containing a silicon alkoxide, an additional component A, and an acidic catalyst, wherein the molar ratio between water molecules and silicon atoms is equal to or higher than 4;
   causing the mixture to gel thereby obtaining a wet gel;
   causing said wet gel to dry; and
   densifing the thus obtained dry gel by means of a thermal treatment having a maximum temperature from 1200° C. to 1400° C.; where
   the additional component A is a dialkyldialkoxysilane, $R_2$—Si—$(OR')_2$, or an alkyltrialkoxysilane, R—Si—$(OR')_3$, wherein R and R' radicals are not aromatic; and
   in the range from 300° C. to 800° C. the thermal treatment is carried out under an atmosphere made up of pure HCl or a mixture containing at least 5% by volume of HCl in an inert gas, said atmosphere being anhydrous and not containing oxygen,
   wherein the sol is deposited in form of a thin layer on a substrate by immersing the substrate in the sol and then extracting the substrate from the sol.

18. Supported thin layers of nanocomposite materials that are fully glassy, black in color, and photoluminescent in red visible light region and/or in infrared region at ambient temperature produced by
   preparing an aqueous or hydroalcoholic mixture containing a silicon alkoxide, an additional component A, and an acidic catalyst, wherein the molar ratio between water molecules and silicon atoms is equal to or higher than 4;
   causing the mixture to gel thereby obtaining a wet gel;
   causing said wet gel to dry; and
   densifing the thus obtained dry gel by means of a thermal treatment having a maximum temperature from 1200° C. to 1400° C.; where
   the additional component A is a dialkyldialkoxysilane, $R_2$—Si—$(OR')_2$, or an alkyltrialkoxysilane, R—Si—$(OR')_3$, wherein R and R' radicals are not aromatic; and
   in the range from 300° C. to 800° C. the thermal treatment is carried out under an atmosphere made up of pure HCl or a mixture containing at least 5% by volume of HCl in an inert gas, said atmosphere being anhydrous and not containing oxygen,
   wherein the sol is deposited in form of a thin layer on a substrate by depositing a drop of the sol on the substrate and rotating the substrate at high speed.

19. Nanocomposite materials that are fully glassy, black in color, and having photoluminescence in red visible light region and/or in infrared region at ambient temperature.

20. Nanocomposite materials of claim 19 having photoluminescence at wavelength at least 780 nm.

21. Nanocomposite materials of claim 19 having photoluminescence centered at 9,570; 8,680 and 7,500 cm-1.

22. Nanocomposite materials of claim 19 having emission intensity according to FIG. 2.

23. Nanocomposite materials of claim 19 comprising elemental silicon.

24. Nanocomposite materials of claim 19 comprising silica.

25. Nanocomposite materials of claim 19 which absorb infrared light at lower than 2,000 cm-1.

26. Nanocomposite materials of claim 19 which absorb infrared light at higher than 10,000 cm-1.

27. Nanocomposite materials of claim 19 which absorb infrared light as illustrated in FIG. 1.

28. Nanocomposite materials that are fully glassy, black in color, and photoluminescent in red visible light region and/or in infrared region at ambient temperature produced by a sol-gel process comprising:
   preparing an aqueous or hydroalcoholic mixture containing a silicon alkoxide, an additional component A, and an acidic catalyst, wherein the molar ratio between water molecules and silicon atoms is equal to or higher than 4;
   causing the mixture to gel thereby obtaining a wet gel;
   causing said wet gel to dry; and
   densifing the thus obtained dry gel by means of a thermal treatment having a maximum temperature from 1200° C. to 1400° C.; where
   the additional component A is a dialkyldialkoxysilane, $R_2$—Si—$(OR')_2$, or an alkyltrialkoxysilane, R—Si—$(OR')_3$, wherein R and R' radicals are not aromatic; and
   in the range from 300° C. to 800° C. the thermal treatment is carried out under an atmosphere made up of pure HCl or a mixture containing at least 5% by volume of HCl in an inert gas, said atmosphere being anhydrous and not containing oxygen, wherein elemental silicon is present in the form of grains nanometer in size embedded in a silica matrix.

* * * * *